Sept. 16, 1952　　　　　　　H. E. ALTGELT　　　　　　　2,610,573
TYING MECHANISM FOR BALERS
Filed June 19, 1944　　　　　　　　　　　　　　　8 Sheets—Sheet 2
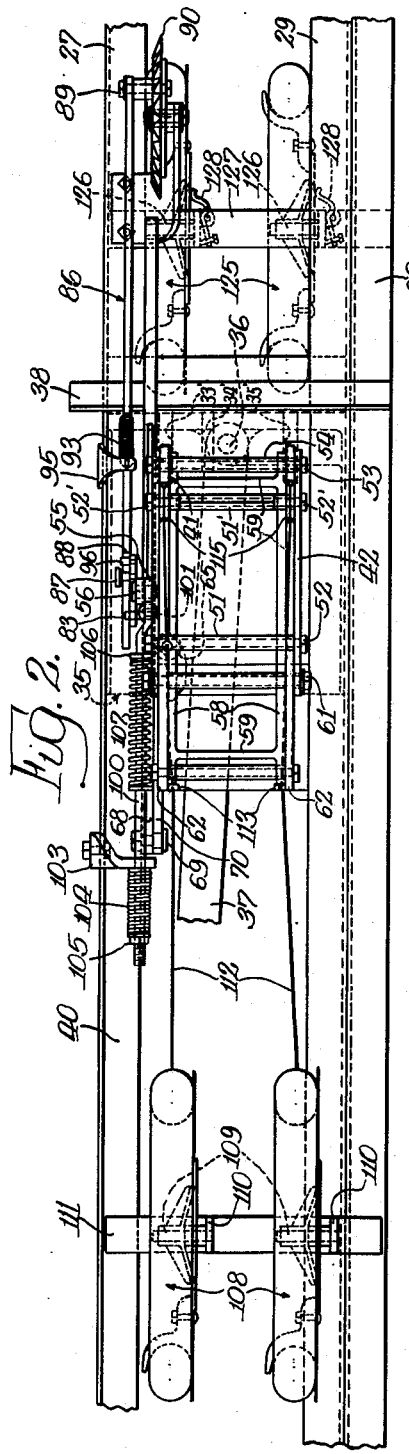
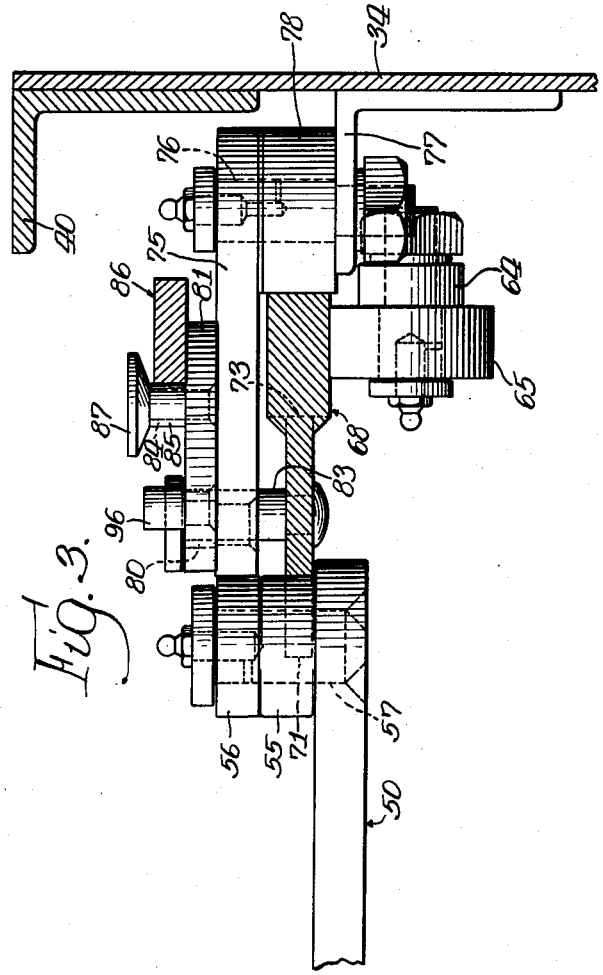
INVENTOR.
Herman E. Altgelt
BY John P. Smith
Atty.

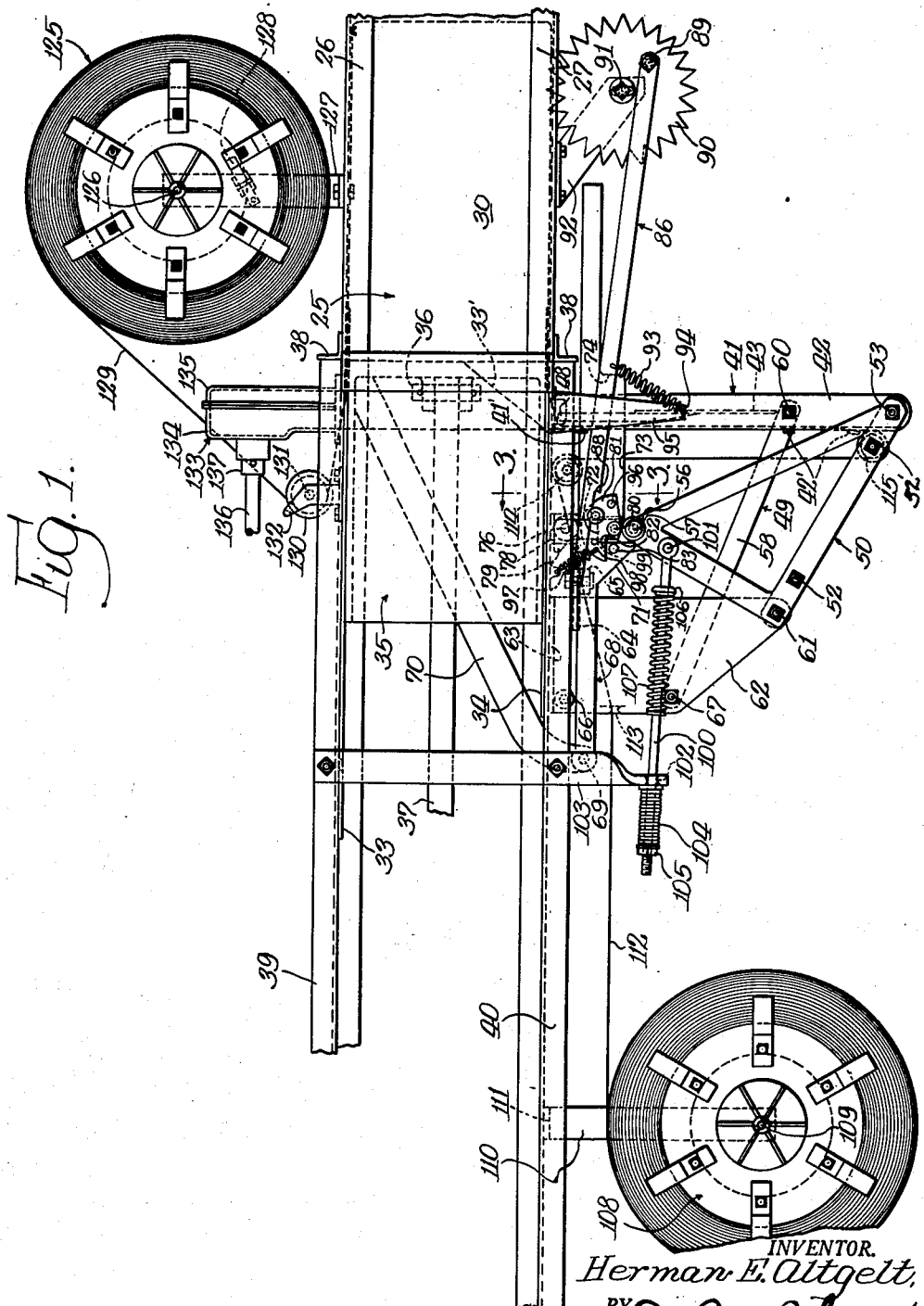

Sept. 16, 1952      H. E. ALTGELT      2,610,573
TYING MECHANISM FOR BALERS
Filed June 19, 1944      8 Sheets-Sheet 3
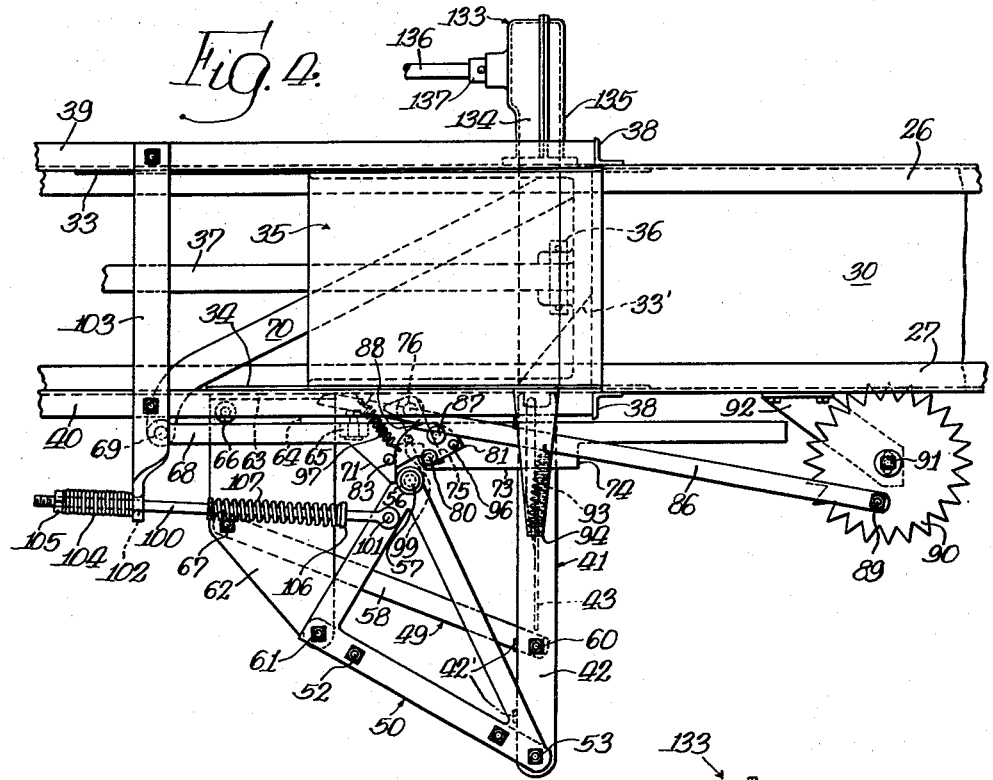
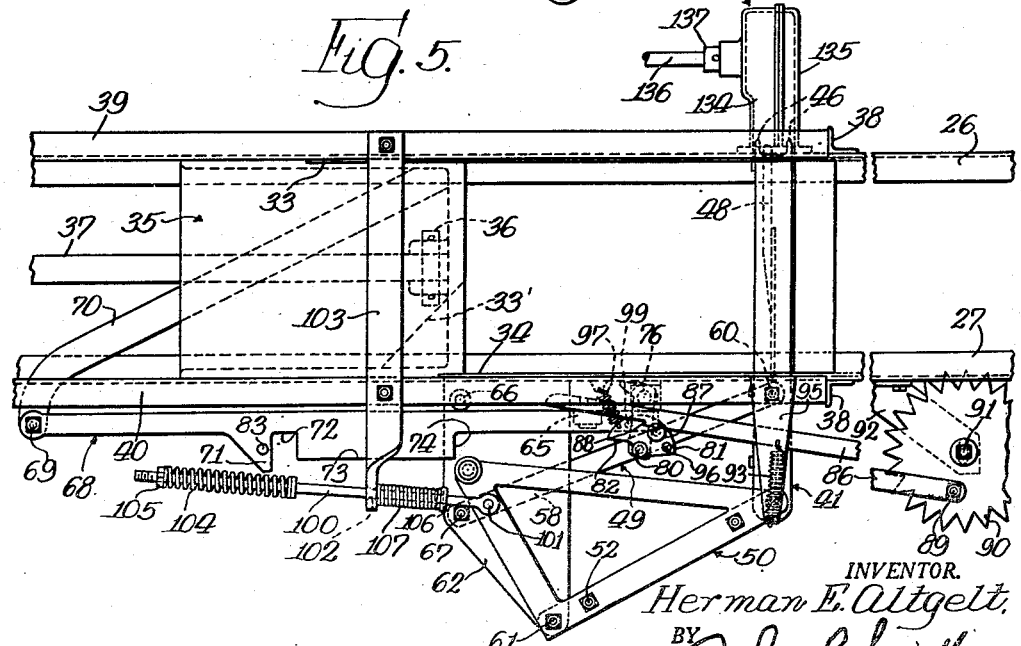
INVENTOR.
Herman E. Altgelt,
BY John P. Smith
Atty.

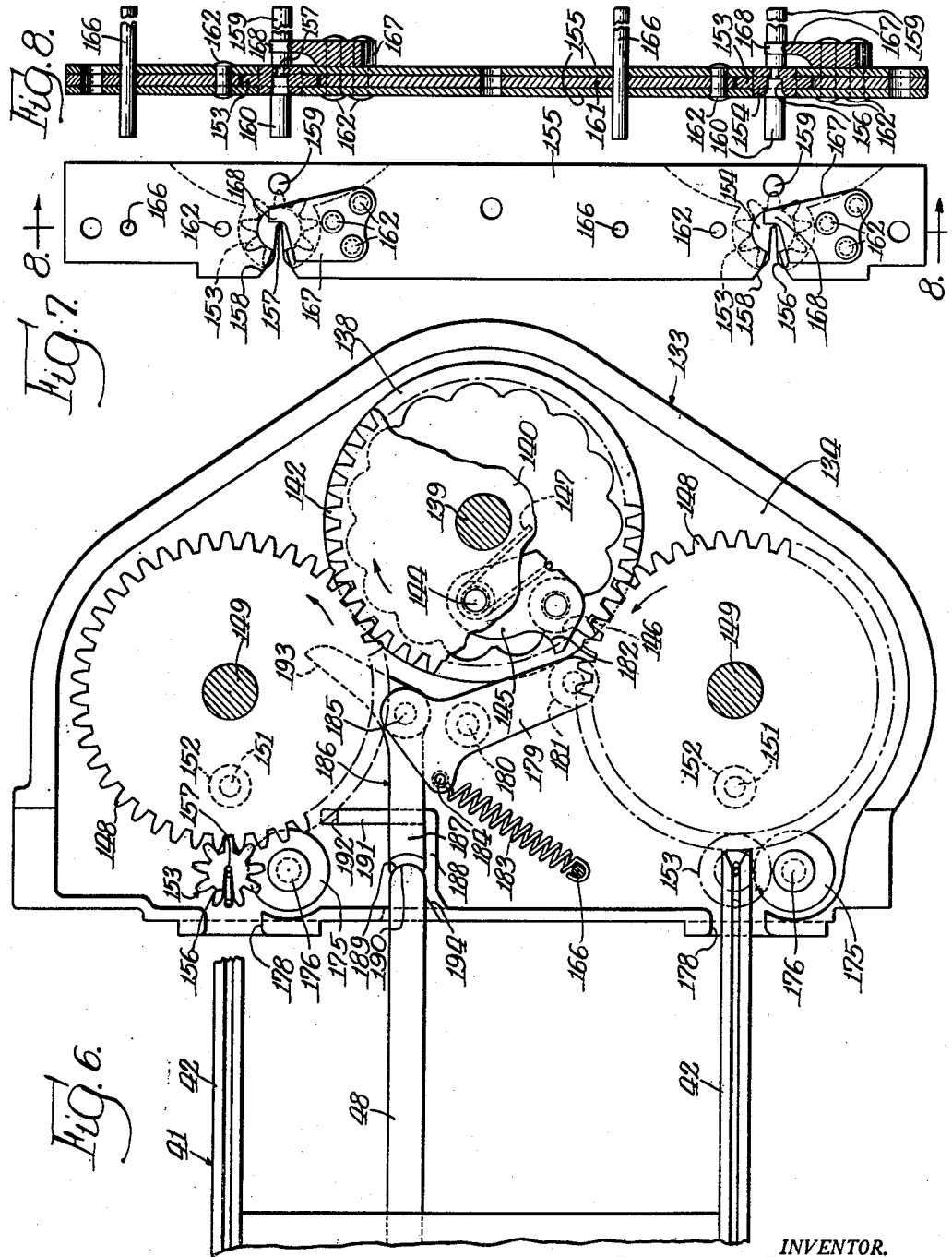

Sept. 16, 1952     H. E. ALTGELT     2,610,573
TYING MECHANISM FOR BALERS
Filed June 19, 1944          8 Sheets-Sheet 5
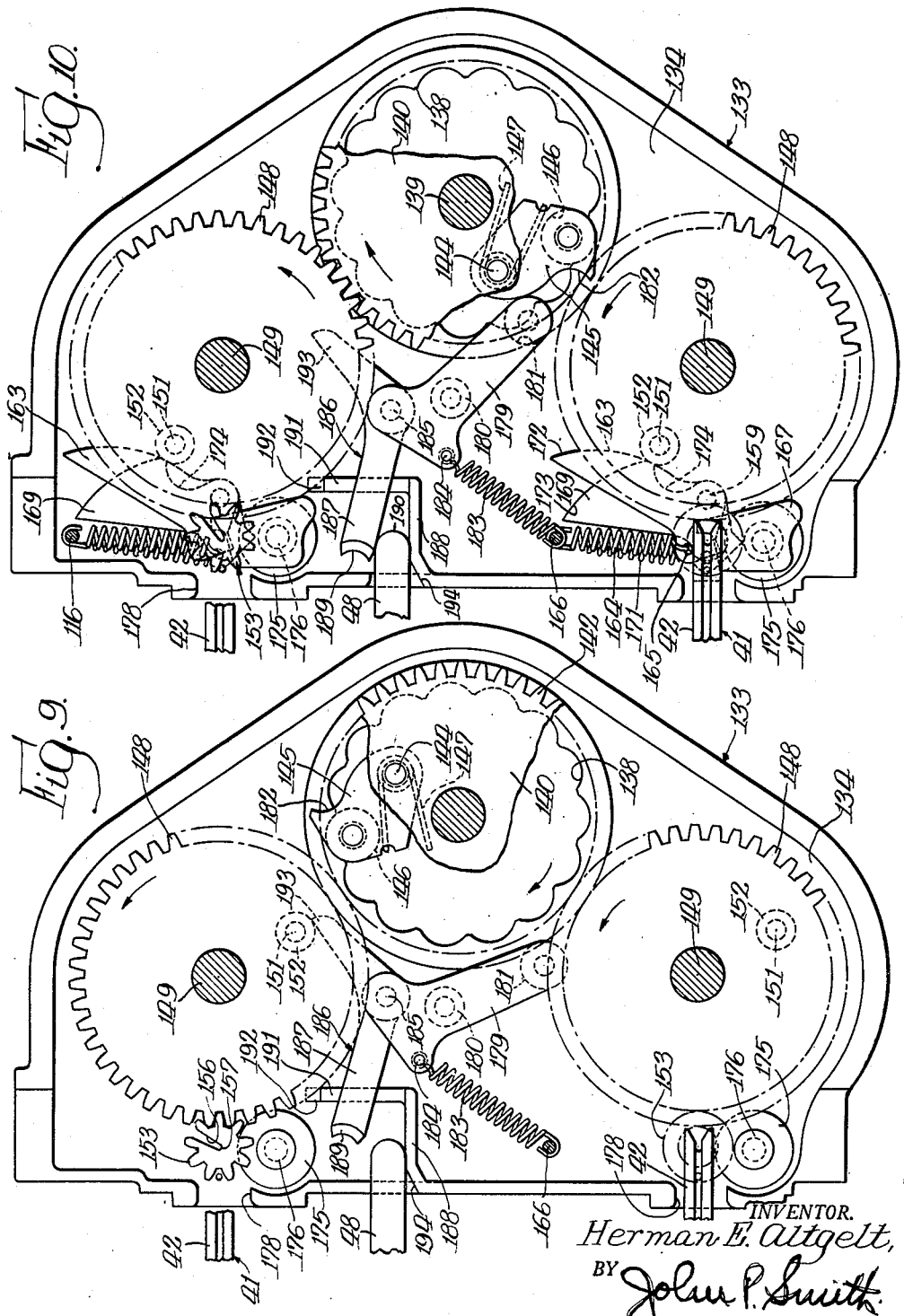
INVENTOR.
Herman E. Altgelt,
BY John P. Smith
Atty.

Sept. 16, 1952 H. E. ALTGELT 2,610,573
TYING MECHANISM FOR BALERS
Filed June 19, 1944 8 Sheets-Sheet 6
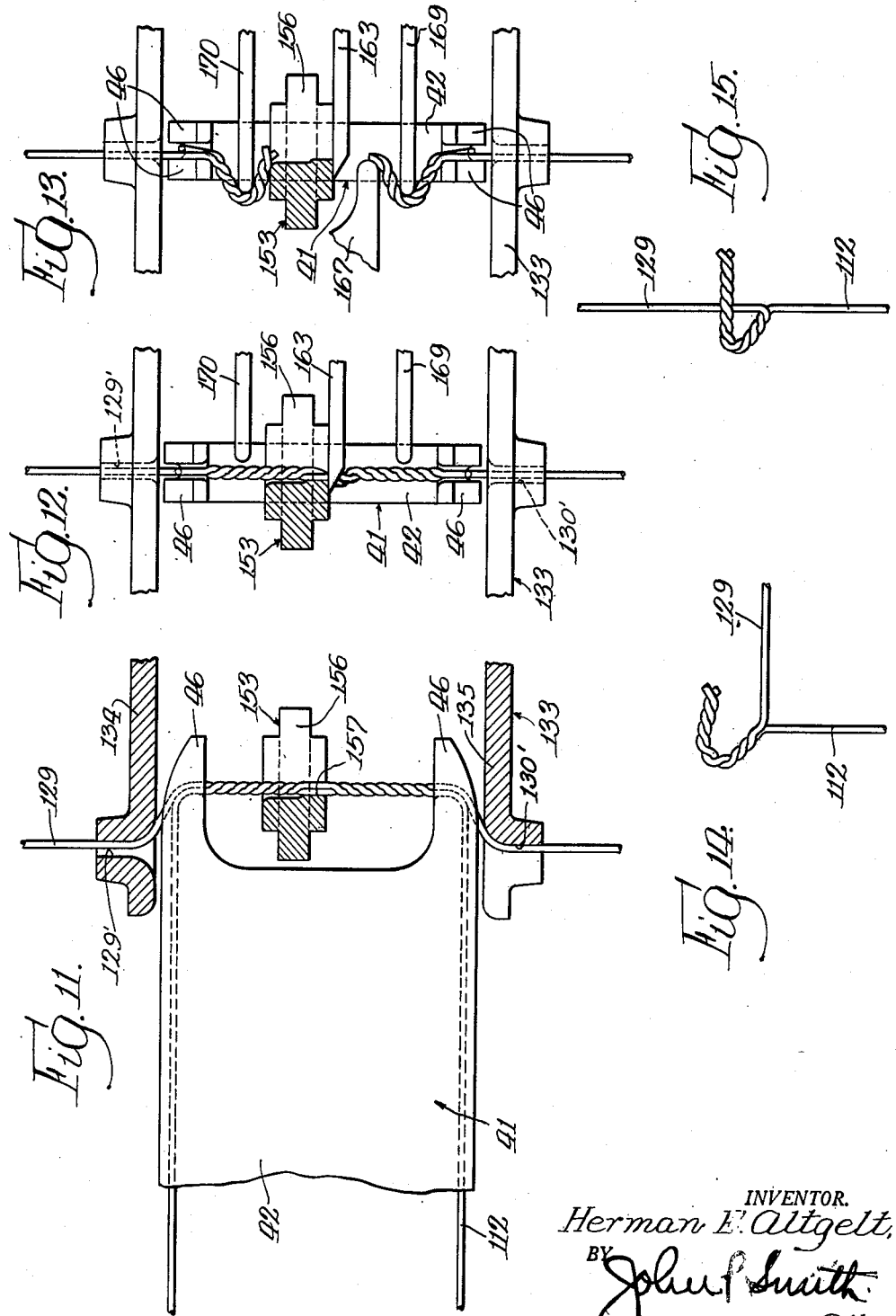
INVENTOR.
Herman E. Altgelt,
BY John F. Smith
Atty.

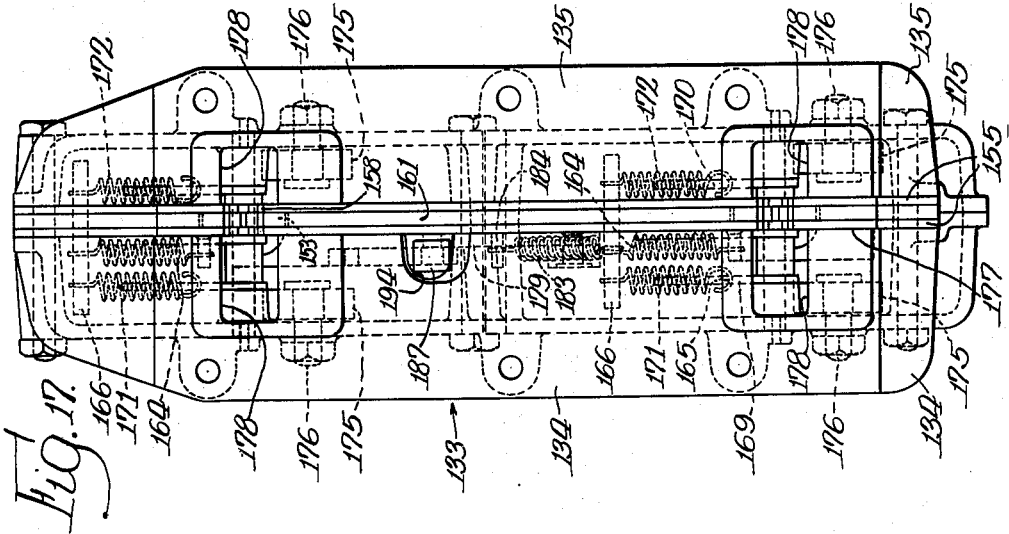
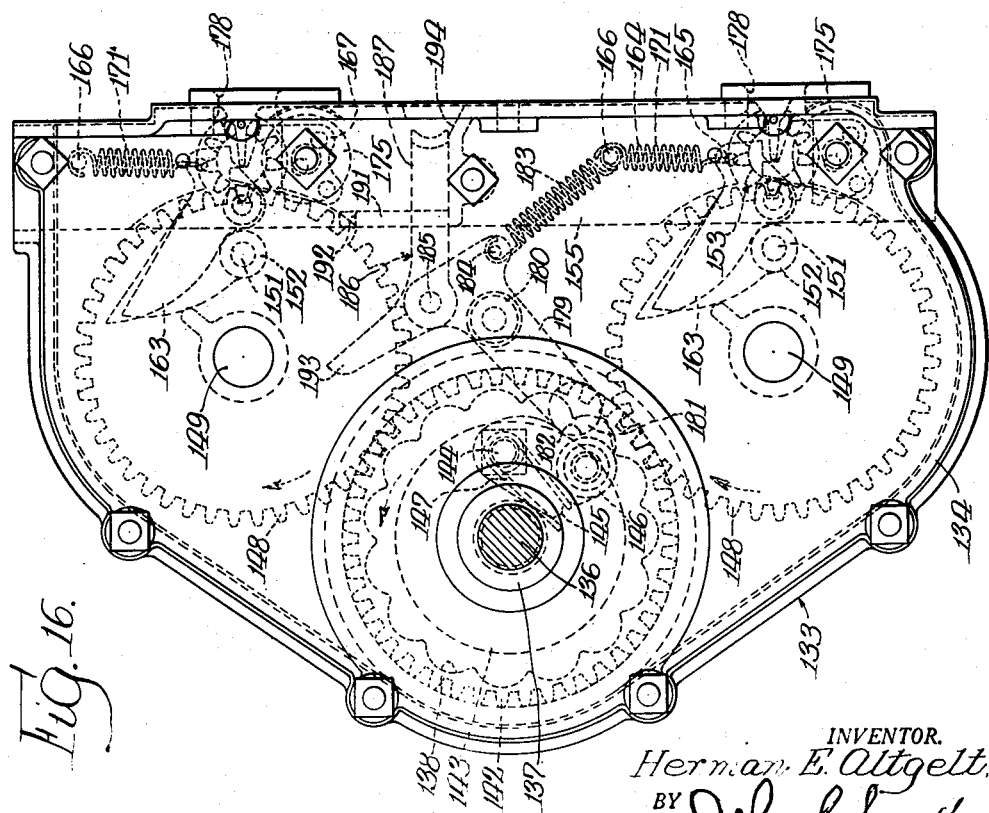

Sept. 16, 1952 H. E. ALTGELT 2,610,573
TYING MECHANISM FOR BALERS
Filed June 19, 1944 8 Sheets-Sheet 8
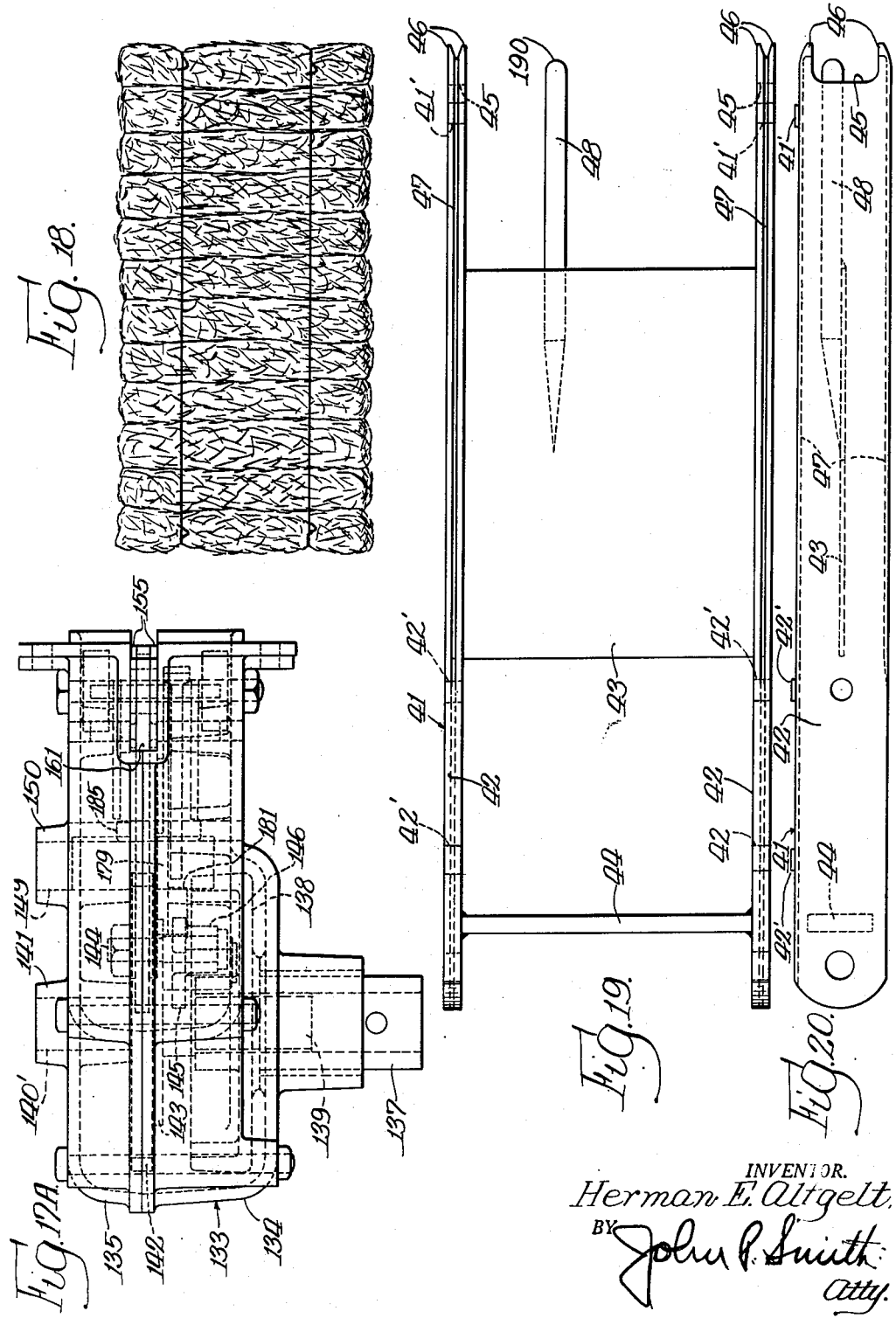
INVENTOR.
Herman E. Altgelt,
BY John P. Smith
Atty.

Patented Sept. 16, 1952

2,610,573

UNITED STATES PATENT OFFICE 2,610,573

TYING MECHANISM FOR BALERS

Herman E. Altgelt, South Bend, Ind., assignor to The Oliver Corporation, a corporation of Delaware Application June 19, 1944, Serial No. 540,918

38 Claims. (Cl. 100—4)

The present invention relates generally to hay balers of the stationary, portable or pick-up type, but more particularly to a novel and improved construction for automatically tying a knot or twisting the ends of two wires together which will positively insure the ends of the wires against being pulled apart under tension.

Attempts have heretofore been made to make or construct an automatic wire tying or twisting mechanism by twisting the ends of wires together, but these attempts have been failures due to the fact that expansion of the compressed bale places undue tension on the wire bands and the twisted ends of such wires under the expansion of the bale causes the twisted ends to become untwisted and separated.

It is, therefore, one of the primary objects of the present invention to not only overcome these difficulties, but to also provide a novel and improved construction of an automatic wire baling mechanism in which laps from two reels of wire on the opposite sides of the baler are brought together, subsequently twisted into two twisted portions, then severed between the two twisted portions, followed by kinking or bending of the twisted portions so that when tension is placed on the bands in the process of forming the bale, the kinks or crank-like formation in the twisted portions of the wire forms in effect a crank and under tension of the expanding bale, will partially revolve in crank-like fashion so as to lock itself against one of the straight portions of the wire to prevent further unwinding.

A further object of the invention is to provide a construction of an automatically actuated wire tying or twisting mechanism which twists two strands of wire at their intermediate portions into two twisted sections, then severs the twisted sections of wires apart and subsequently bends or kinks each of the resulting twisted ends into hooks or cranks, after which the cranks revolve to become locked upon the straight portions of the wire when the bands surrounding the bale are placed under tension by the expanding bale, to thereby prevent the ends of the wires from becoming untwisted.

A further object of the invention is to provide a novel and improved construction of an automatic wire twisting or wire knotting mechanism for a hay baler, in which the clutch of the twisting mechanism is arranged to make one complete cycle of operation before the shuttle automatically disengages itself from the knotting or twisting mechanism and thereby permits the shuttle to remain in contact momentarily with the knotting mechanism before it is returned to its normal inoperative position outside the hay compression chamber.

These and other objects are accomplished by providing an improved construction, the arrangement of the various parts of which are hereinafter described and particularly pointed out in the appended claims.

Referring to the drawings:

Fig. 1 is a fragmentary top plan view of the compression chamber and plunger construction of a conventional hay baler of the stationary or pick-up type of baler, showing my improved automatic knotting or twisting mechanism embodied therein;

Fig. 2 is a side elevational view of the construction shown in Fig. 1;

Fig. 3 is an enlarged fragmentary cross sectional view taken on the line 3—3 in Fig. 1;

Fig. 4 is a fragmentary top plan view showing the metering wheel turned sufficiently by charges of hay moved through the compression chamber to trip the shuttle mechanism in operation;

Fig. 5 is a fragmentary top plan view showing the relative position of certain of the operating parts when the shuttle is actuated across the baling chamber in the operation of tying the bale;

Fig. 6 is a fragmentary enlarged view of the tripping mechanism for the clutch showing the clutch tripped for starting the wire twisting pinions into operation;

Fig. 7 is a detailed side elevational view showing the plate members which support the wire twister pinions and the wire severing and bending members;

Fig. 8 is a cross sectional view taken on the line 8—8 in Fig. 7;

Fig. 9 is a view similar to Fig. 6 showing the manner in which the pawl tripping lever is disengaged from the clutch tripping finger by a roller on one of the gears;

Fig. 10 is a similar view showing the relative position of the operating parts of the knotting mechanism as these parts approach the conclusion of one cycle of operation;

Fig. 11 is a fragmentary detailed view showing the first step in the operation in which one of the shuttle members and one of the wire twisting pinions reach approximately the conclusion of the twisting operation of the two strands of wire;

Fig. 12 is a similar view in the next step of severing the twisted wire sections at the conclusion of the twisting operation;

Fig. 13 is a similar view showing the next successive step in the operation of bending or kinking the twisted severed sections of the wire;

Fig. 14 shows the manner in which the ends of the wire are twisted together and kinked or bent into the form of a crank at the conclusion of the twisting, severing and kinking operation;

Fig. 15 is a similar view showing the manner in which the cranked or kinked portion of the twisted wire locks itself against the straight strand of the wire when the wire is placed under tension;

Fig. 16 is a side elevational view of the knotter casing showing the relative position of all the operative parts in their inoperative positions;

Fig. 17 is an end elevational view of the construction shown in Fig. 16;

Fig. 17A is an end elevational view of the casing for the wire tying mechanism;

Fig. 18 is a top plan view of a bale of hay showing the manner in which my improved knotting or wire twisting mechanism secures and binds two wire bands about the bale of hay;

Fig. 19 is a detailed side elevational view of the shuttle; and

Fig. 20 is a top plan view of the same.

In order to illustrate the construction for carrying out my improved invention of an automatic wire twisting or knotting mechanism for a baling press of the stationary or pick-up type, I have shown the same in connection with a fragmentary portion of the baling chamber, together with its associated structure. Only such parts that are common or essential to the stationary and pick-up baler and cooperate with my invention are shown in the drawings. Other parts, such as the reciprocating feeder which is synchronized with the plunger and alternately feeds the hay downwardly into the bailing chamber on the return movement of the plunger, have been eliminated from the present drawings for the purpose of clearness.

In illustrating one form of my invention, I have shown the same in connection with the more or less conventional form of hay baler generally indicated by the reference character 25 and comprises horizontally spaced top main frame members or angles 26 and 27 which extend longitudinally throughout the baling chamber and extension thereof. Spaced vertically below each of the angle members 26 and 27 are longitudinally extending lower main frame members or angles 29. Extending throughout the compression chamber and the extension thereof and secured to the opposite angle members 29 is a sheet metal bottom 30. Reinforcing the lower angle members 29 are supplemental main frame or angle members 32. Located between the upper and lower angle members and secured to the inner sides thereof are sheet metal side walls 33 and 34 forming in effect the compression chamber. Reciprocably mounted in the compression chamber is a plunger, generally indicated by the reference character 35. The plunger head of the plunger 35 has three vertically spaced horizontal slots 33', 34' and 35' for permitting the shuttle to move transversely on the withdrawal of the plunger from the compression chamber in the manner hereinafter described. Pivotally connected as shown at 36 to the plunger 35 is a pitman bar 37. The pitman bar is connected to the usual crank operated transmission mechanism which in turn may be operatively driven from the power take-off of the tractor or by the usual separate engine or motor mounted on and carried by the stationary or pick-up type of hay baler in the manner well understood in the art.

The construction thus far described is the parts that are common to the conventional type of hay baling press of either the stationary, portable or pick-up type. Reinforcing and bracing the main frame members are opposite vertical angle braces 38. Reinforcing and bracing the top angle members 26 and 27 and extending from the vertical braces 38 are supplemental angle main frame members 39 and 40.

The mechanism which automatically controls and actuates the shuttle of my improved wire tying or twisting mechanism will next be described. This mechanism includes a transversely and intermittently reciprocable shuttle, generally indicated by the reference character 41, and shown in detail in Figs. 19 and 20 of the drawings. This shuttle 41 consists of, in effect, two vertically spaced apart and horizontally positioned shuttle members 42. Each of the two shuttle members conveys a wire across the baling chamber and is operable with the separate knotting or twisting mechanisms for tying or twisting the two separate spaced apart bands about the bale on each occasion that the shuttle is actuated across the baling chamber as shown in Fig. 18 of the drawings. In this connection it will be noted that each wire band about the bale has two knots or twisted portions. This is necessitated by the fact that at the conclusion of binding the wire band around one bale, the wires from the reels on the opposite sides of the baler must be secured together for the next succeeding bale. These two shuttle members 42 are rigidly held together by a longitudinally extending vertical plate as shown at 43. The plate 43 secures the intermediate portions of the members 42 together and terminates some distance short of both ends of the shuttle members 42. The outer ends of the shuttle members are further reinforced by a connecting brace 44. The inner ends of the shuttle members are provided with recesses or cut out portions as shown at 45 so as to provide oppositely and forwardly as well as vertically spaced projecting points as shown at 46. The opposite edges of each of these shuttle members 42 are provided with longitudinally extending wire grooves 47 which extend to the inner ends of the shuttle members and terminate in enlarged and relatively deep transverse recesses or grooves between the vertically spaced pointed portions 46 of the shuttle members 42 for holding, guiding and forcing the baling wire into the slots of the wire twister pinions hereinafter described. The shuttle member 41 is provided with a clutch trip finger 48 which is welded to one side of the plate 43 and extends parallel to each of the shuttle members 42. The inner end of the finger 48 projects to a point substantially in line with the inner ends or points 46 of each of the shuttle members 42. In order to retain the wire in one of the longitudinal grooves 47 of each of the shuttle members 42 vertical wire retainer guides or bridges 41' and 42' are provided. The retainer guide 41' is located adjacent the forward end of each of the shuttle members and the wire retainers 42' are spaced apart and located adjacent the outer end of each of the shuttle members.

The outer end of the shuttle 41 is pivotally connected to substantially parallel link members generally indicated by the reference characters 49 and 50. The link 50 is in the form of two vertically spaced apart triangular bell-cranks which are rigidly held together in spaced relation with respect to each other by vertically extending members 51 and 51'. The member 51 is in the form of a spacer tube and is secured in position through the medium of a bolt 52. The spacer member 51' is in the form of a post having its opposite ends threaded for the reception of nuts 52'. One of the outer and free ends of the bell-crank member 50 is pivotally connected by means of a vertically extending bolt 53 and spacer tube 54 to the outer ends of the spaced apart members 42 of the shuttle member 41. The other free end of the upper triangular bell-crank member 50 is provided with two rollers, lower roller 55 and upper roller 56 journaled on a common pin or shoulder bolt 57, for the purpose hereinafter set forth. The other parallel link 49 consists of two flat bars 58 and held in rigid spaced relation with respect to each other by vertical bars 59 having their opposite ends welded to the respective bars. The outer free ends of the bars 58 forming the link 49 are pivotally connected, by means of a vertically extending bolt 60, to each of the shuttle members 42 of the shuttle 41. The upper and lower triangularly shaped bell-crank members 50 are pivotally connected as shown at 61 to upper and lower spaced apart plates or brackets 62. These vertically spaced and horizontally positioned plates 62 are welded to a vertical plate 63 which in turn is rigidly secured to the upper and lower main frame angle members 40 and 29 respectively of the baler frame. Welded to the underside and adjacent the rear edge of the upper plate 62 is a roller bracket 64 on the rear end of which is journaled a roller 65 for the purpose hereinafter set forth. Journaled on the top surface of the upper plate 62 adjacent the main angle frame member 40 is a second roller 66 for the purpose hereinafter set forth. The forward ends of the bars 58 forming one of the parallel links 49 are pivotally connected as shown at 67 between and to the spaced apart plates 62. From the above description it will be obvious that the parallel link arrangement of the links 49 and 50 move the shuttle member 41 substantially in a horizontal and rectilinear direction across the baling chamber when the same is actuated to carry or convey the wires thereacross in the manner hereinafter described.

The mechanism which automatically trips and actuates the shuttle to tie the bale when a sufficient amount of hay is compressed within the baling chamber will next be described. The shuttle 41 is actuated across the baling chamber after a predetermined amount of hay has been compressed in the baling chamber, by the rearward movement of the plunger 35 and through the medium of a shuttle actuating bar 68 which has its forward end pivotally connected as shown at 69 to an outwardly turned end of a diagonally disposed bar 70, which in turn, is secured to the plunger head 35. The forward end of the bar 70 is positioned below and projects outwardly from the longitudinally extending main frame member 40 as clearly shown at 70 in Fig. 1 of the drawings. The reciprocatory movement of the shuttle actuating bar 68 is guided by the respective rollers 65 and 66. An intermediate portion of the actuating bar 68 is provided with an inclined and laterally projecting portion as shown at 71. Positioned rearwardly of the lateral projection 71 is a recess or slot 72 which, when the shuttle mechanism is tripped, is adapted to receive the roller 55 for actuating the bell crank 50 and the shuttle 41, in the manner hereinafter described. Rearwardly of the slot 72 in the actuating bar 68 is a straight raised portion, as shown at 73, which terminates in a shoulder 74. The shoulder 74 of the actuating bar 68 moves in the path of and is adapted to engage the roller 55 of the bell-crank 50 on the next compression movement of the plunger following the actuation of the shuttle member 41, to return the shuttle to its outer or inoperative position or the position shown in Fig. 1 of the drawings. It will be obvious that the shuttle actuating bar 68 moves to and fro with the actuation of the plunger, but that the shuttle must be only actuated when a sufficient amount of hay has been compressed to form a bale. The roller 55, therefore, is held out of the recess 72 of the actuating bar 68 by a tiltable bar or post 75 which is pivoted to a pin 76 carried by an angle bracket 77, which in turn, is secured to the plate 34 of the compression chamber. Journaled on this pin 76 below the tiltable post 75 is a roller 78 which engages and guides the inner edge of the actuating bar 68 in its movement. (See Fig. 3 of the drawings.) The tiltable post 75 is provided on its inner foremost end with the leg or foot 79 which limits or stops the forward pivotal movement of the post 75 in a clockwise direction about its pivot 76 as viewed in Fig. 1 of the drawings. The outer or free end of the post 75 is located in vertical alignment with the recess 72 of the actuating bar 68 when that bar occupies a position, with the plunger in its rearmost position or the position shown in Fig. 1 of the drawings. The post lies in the path of and is adapted to engage the upper roller 56 and therefore holds the roller 55 out of engagement with the recess 72 of the actuating bar except on such occasions as when the tilting post 75 is tripped or actuated out of position in the manner hereinafter described. Pivotally mounted on the outer or free end of the tiltable post 75 as shown at 80 is a tripper arc 81. The tripper arc 81 is substantially in the form of a semicircular disc and is provided with a cord-like cut out portion as shown at 82 which moves in the path of and is adapted to engage the upwardly and vertically projecting pin 83 secured to the laterally projecting portion 71 of the actuating bar 68 in the manner hereinafter described. Journaled on a pin 84 secured to the tripper arc 81 is a roller 85 which lies in the path of and is adapted to engage the metering wheel bar, generally indicated by the reference character 86. The pin 84 has an enlarged overhanging head 87 for the purpose of guiding and maintaining the bar 86 in position contacting the roller 85. The forward end of the bar 86 is reduced in width forming a shoulder, as shown at 88, which is adapted to engage the roller 85 on the tripper arc 81 in the manner hereinafter described. The rear end of the tripper bar is pivotally attached as shown at 89 to a metering wheel 90, which in turn, is adjustably and rotatably connected by means of a bolt 91 to a bracket 92 secured to the main frame angle member 27. The metering wheel 90 has its periphery provided with a plurality of pointed teeth so that a portion thereof projects into the bale extension for engagement with the bale in measuring the same to intermittently trip the shuttle mechanism to actuate the same for tying the bale in the manner hereinafter described. The metering bar 86 has its forward end normally engaging or rather pressed into engagement with the roller 85 by an extension spring 93 which has one end thereof connected to the bar 86 and the other end thereof connected as shown at 94 to a bracket 95 projecting laterally from and secured to the angle member 40. Secured to the top surface of the tripping arc 81 is an upwardly extending pin 96 which is adapted to move into the path of and engage the edge of the metering bar 86 to disengage the notch 88 of the bar from the roller 85 of the tripping arc when the same has been moved sufficiently forward. The tripping arc 81 and post 75 are normally actuated about their respective pivots 80 and 76 by a spring 97 which has one end connected to the main frame angle 40 and the other end connected to the tripping arc 81 as shown at 98. This spring 97 actuates the tripping arc in a clockwise direction as viewed from Fig. 1 of the drawings and its movement is limited in this direction by a downwardly projecting lug or pin 99 which engages the forward edge of the post 75. The bell-crank 50 and its associated roller 56 are held spring pressed against edge of the post 75. The bell-crank 50 and its as pivotally connected, as shown at 101, to the upper triangular bell-crank and the other end thereof extending through an aperture 102 located in the outer end of a transverse bar 103 secured to the opposite angle frame members 39 and 40. Embracing the rod 100 forwardly of the bar 103 is a compression spring 104, the tension of which may be adjusted by a nut 105 mounted in threaded engagement at the forward end of the rod 100. The rod 100 is provided adjacent its forward end with a shoulder or flange 106 which is adapted to engage one end of a spring 107 surrounding an intermediate portion of the rod. The other end of the spring 107 is adapted to engage the transverse bar 103 to place the bell-crank under tension when the operative parts are in the position shown in Fig. 5 of the drawings to assist in returning the shuttle member 41 to its normal or outermost position, as shown in Fig. 1 of the drawings.

From the above description it will be seen that when the operating parts are in the position shown in Figs. 1 and 2 of the drawings, on each reciprocation of the plunger 35 the actuating bar 68 will be similarly reciprocated, but the bar 68 will be ineffective to actuate the shuttle 41 by reason of the fact that the tiltable member 75 engages the upper roller 56 of the bell-crank 50 to hold the lower roller 55 out of engagement with the recess 72 in actuating bar 68. However, when sufficient hay has been compressed in the compression chamber and extension thereof, so as to actuate the metering wheel 90 from the position shown in Fig. 2 of the drawings to the position shown in Fig. 4 of the drawings, the shuttle then will be actuated by reason of the tripping mechanism and associated parts in the manner as follows: When the metering wheel 90 is revolved by reason of a sufficient amount of compressed hay engaging the same, it will actuate the bar 86 forwardly so that the notch 88 thereof engages the roller 85 in the tripping arc 81, causing the tripping arc to rotate about its axis 80 on the post 75 in a counter-clockwise direction. As the tripping arc 81 is revolved, the cord-like portion 82 thereof, engages the pin 83 of the actuating bar 68 so that a further movement of the arc under these circumstances tilts the post 75 rearwardly about its pivot 76, removing the end of the post from the path of the roller 56 on the bell-crank 50 and permitting the roller 55 to be seated in the recess 72 of the actuating bar 68. In this connection it will be noted that the spring 104 is under compression, as shown in Figs. 1 and 4 of the drawings, and therefore actuates the roller 55 and bell-crank 50 into operative engagement with the actuating bar 68. In Fig. 4 of the drawings, the tiltable post 75 and tripping arc 81 are shown actuated to the position preparatory to permitting this engagement of the roller 55 of the bell-crank 50 to engage the recess 72 in the actuating bar 68 to actuate the shuttle transversely of the baling chamber, simultaneously with the return or forward movement of the plunger 35. As the metering bar 86 is moved or advanced further forwardly by the engagement of the metering wheel with the moving bale, the pin 96 on the tripping arc 81 engages the edge of the bar 86 at a point adjacent the notch 88 therein to disengage the notch 88 from the roller 85 so as to permit the tripping arc to return to its normal position with respect to the post 75 or the position in which the pin 99 engages the forward edge of the post 75. As this occurs the spring 97 not only normally returns the tripping arc 81 to its normal or stopping position but also returns the post 75 to its normal or forward position in which the leg of foot 78 of the post 75 engages the bracket to resume its normal position, or the position shown in Fig. 1 of the drawings preparatory to holding the roller 55 of the bell crank 50 out of engagement with the notch 72 of the actuating bar 68. It will be observed by examining Fig. 5 of the drawings that when the shuttle 41 is actuated across the baling chamber by the return movement of the plunger 35, the roller 55 of the bell-crank 50 will become disengaged from the slot or recess 72 in the actuating member 68 as shown in Fig. 5 of the drawings and when the roller becomes thus disengaged it will ride along the straight edge or guide 73 of the actuating bar 68 to momentarily hold the shuttle member 41 in position to support and hold the wires in the knotter housing during the wire twisting, wire severing and wire bending operations in the manner hereinafter described.

It will also be noted that when the bell-crank 50 is actuated to the position shown in Fig. 5, it compresses the spring 107 on the rod 100 so that when the roller 55 of the bell-crank 50 reaches the rear end of the straight portion 73 the spring will actuate the bell-crank 50 about its pivot 61 so as to place the roller 55 of the bell-crank 50 in position to engage the shoulder 74 of the actuating bar 68 to return the bell-crank 50 and shuttle 41 from the position shown in Fig. 5 to the position shown in Fig. 1 of the drawings preparatory to again actuating the shuttle mechanism when the next bale is to be tied.

The mechanism for supporting, feeding and controlling the wires for binding or baling the bales of hay from four reels of wire will next be described. The invention in the present instance provides for the tying or twisting of two spaced apart bands on each bale by two identical knotting or twisting mechanisms which operate simultaneously in cooperation with the two shuttle members 42 of the shuttle 41 so as to place two spaced apart bands on each bale of hay in the manner shown in Fig. 18 of the drawings. In this connection it will be noted that each of the bands is provided with two twists or knots located on one side of the bale at points adjacent the opposite ends. This is necessitated by the fact that the wire supplied from each of the reels on one side of the baling chamber must be bound to the wire from each of the reels on the other side of the baling chamber at the conclusion of the binding of one bale and the beginning of the next succeeding bale. To accomplish this on each actuation of the shuttle across the baling chamber a double twist of the wires forming the upper and lower bands is secured and subsequently cut in sections, one of which forms the final knot in the bound bale and the other of which forms the knot for connecting the opposite wires together preparatory to receiving and supporting the first charge of hay for the next succeeding bale. The manner in which this is accomplished will hereinafter be more fully described.

Supported on one side of the baling frame adjacent the shuttle mechanism are two horizontally spaced apart reels of wire generally indicated by the reference character 108, the upper one of which carries wire for a portion of the upper band and the lower of which carries a wire for a portion of the lower band on the bale. These reels are in vertical axial alignment and are journaled on pins 109 carried by brackets 110 which in turn are secured or welded to a bar 111 secured to the main frame members 40 and 32. The wires from each of these reels 108 are designated by the reference character 112. These wires extend from their respective reels through eyelet brackets 113 secured to plates 62, from where they are trained around grooved pulleys 114 journaled on brackets (not shown) secured to the side wall 34 of the compression chamber. The wires 112 extend from each of these pulleys 114 to grooved pulleys 115 journaled on the opposite shouldered ends of the spacer post 51' between and carried by the bell-crank members 50. The wires from these latter pulleys are threaded into the forward grooves 47 of each of the shuttle members 42 and inside the wire guides or bridges 41' and 42' of the shuttle members. From this point the wires extend into and across the forward grooves between the pointed inner ends 46 of the respective shuttle members 46. In Fig. 1 of the drawings, the wire is shown as embracing a substantial portion of one end of a bale preparatory to tying the other end thereof. Each of these pulleys 114 and 115 have their wire grooves located in the same plane with each of the wire grooves 47 of the respective upper and lower shuttle members 42 of the shuttle 41. From the above description it will be obvious that by having the pulleys 115 carried by the bell-cranks 50 which actuate and move with the shuttle 41, sufficient supply of wire is made available in the inward stroke of the shuttle to therefore relieve the strain on the unreeling wires by rapid movement of the shuttle. Located on the other side of the baling press are two similar upper and lower wire reels indicated by the reference character 125. These reels are located in vertical axial alignment with one another and the upper one supplies the wire for a portion of the upper band while the lower one supplies the wire for a portion of the lower band on each bale. These reels are journaled on pins 126 carried by a bracket 127 secured to the side frame members 26 and 29. The tension or resistance of the unwinding wire from these reels may be regulated by adjustable tension or friction members generally indicated by the reference characters 128. The wire from each of these reels 125 is indicated by a dash and dot line and by the reference character 129. These wires 129 are trained about the pulleys 130, which in turn are journaled on pins 131 carried by the brackets 132 secured to the upper and lower main frame or angle members. The grooves in these upper and lower pulleys 130 are located in substantially the same planes with the respective upper and lower reels 125 and are adapted to convey the wires in planes parallel to the wires being carried across by the respective upper and lower shuttle members 42 of the shuttle 41. The wires 129 normally extend through apertures 129' in the front section 134 of the housing 133 and are adapted to be moved into and out of horizontally positioned slots 130' of the rear section 135 of the housing 133. (See Figs. 1, 11 and 12.)

The mechanism which successively twists two strands of wire which are brought together from the opposite sides of the baler, severs the double twisted portions into two sections and subsequently kinks or bends each of the twisted sections and secures the wires together so that when the twisted or kinked sections are placed under tension by the banded bale, the cranked or kinked end of the twisted wire will revolve against one of the straight portions in the manner of the steps disclosed in Figs. 11 to 15 inclusive of the drawings. The engagement of the crank-like twisted end with the straight portion of the band locks the knotted or twisted ends and prevents them from becoming unwound. In this connection it will be observed that the automatic wire twisting or tying mechanism for the upper and lower bands are of identical construction, and the function and the operation of the parts are synchronized with and controlled by the actuation of the shuttle mechanism previously described. The two separate wire twisting, wire severing and wire bending mechanisms are mounted in a casing or housing generally indicated by the reference character 133. The housing 133 consists of two sections 134 and 135 which are bolted together and in turn are secured to the main frame members on the side of the baler frame directly opposite the shuttle member 41. Supported in the central portion of the housing 133 is a continuously driven stub shaft 136 which is operatively and continuously driven by suitable transmission gearing mechanism from the gearing and transmission mechanism which operatively drives the reciprocating plunger 35 in any well known manner. The drive shaft 136 is pinned or secured to a sleeve 137 of a continuously driven clutch member 138 journaled in one of the housing sections 134. Located within the housing and journaled in the sleeve 137 of the continuously driven clutch member 138 is a spindle 139 of an intermittently driven clutch member 140. The intermittently driven clutch member 140 is provided with a second spindle 140' which is in alignment with the spindle 139 and is journaled in a bearing barrel 141 formed in the housing casing 135. (See Figs. 17A of the drawings.) Formed integrally with the intermittently driven clutch member 140 is a gear 142 which meshes with and operatively drives two similar gears for driving each of the wire twisting, severing and kinking mechanisms in the manner hereinafter described. Formed integrally with the intermittently driven clutch member 140 is a disclike portion as shown at 143 which is adapted to engage a roller arm for limiting its inward movement with respect to the clutch member in the manner hereinafter described. Pivotally mounted on a pin 144 carried by the intermittently driven clutch member 140 is a roller clutch pawl 145. Journaled on the free end of the pawl 145 is a roller 146. The roller 146 is located in the path of and is adapted to engage internal corrugations of the continuously driven clutch member 138. The roller pawl 145 is normally urged outwardly by a hairpin-type spring 147 which has its intermediate portion embracing the pin 144 and one of its free ends engaging the pawl 145 in one instance and the other end thereof engaging the hub of the spindle 139 of the intermittently driven clutch member 140. The gear 142 of the clutch member 140 meshes with and operatively drives upper and lower gears 148. These separate gears 148 form part of the driving connection for operating each of the separate wire twisting, severing and bending mechanisms for the separate bands that are bound about each bale. The gears 148 have oppositely disposed spindles or stub shafts formed integrally therewith, as shown at 149, which are journaled in the oppositely disposed bearing portions 150 formed integrally with the housing sections 134 and 135. Secured to and projecting from the opposite faces of each of the gears 148 are pins 151 having opposite rollers 152 journaled thereon. These rollers lie in the path of and are adapted to engage and actuate the respective wire severing and wire bending or kinking mechanism in the manner hereinafter described. Meshing with and operatively driven by the respetive upper and lower gears 148 are wire twisting pinions, generally indicated by the reference character 153. These wire twisting pinions have oppositely disposed disc-like hubs 154 which are journaled in aligned apertures formed in the opposite and spaced apart supporting plates or bars 155. (See Figs. 7 and 8 of the drawings.) The pinions 153 have nine teeth while each of the gears 142 and 148 have forty-five teeth so that upon one revolution of the intermittently driven clutch member, the wire twister pinions will make five revolutions to effect a twisting of the wires. These pinions are provided with radially projecting wire twisting grooves or tapered recesses as shown at 156, which extend from the base of and between two adjacent teeth of each of the pinions and extend in a converging form to approximately the axial center of each of the pinions to form semi-circular portions as shown at 157 for receiving the two strands of wire conveyed thereto by the shuttle members 42 of the shuttle 41. (See Figs. 6, 9, 10 and 11 of the drawings.) The semi-circular portion 157 is of reduced diameter and is slightly larger than one diameter of the wire so that it will hold the two wires in effecting the twisting operation. The portion of each of these pinions 153 adjacent the reduced slot 157 cooperates with the knife hereinafter described to shear the wires during the cycle of operation of this mechanism in the manner hereinafter described. In alignment with the radially extending slots in each of these pinions when these pinions are in their normally stopped position or the position shown in Figs. 7 and 8 of the drawings, are horizontally disposed slots 158 formed in the opposite plates 155. The upper and lower surfaces of these slots diverge or are curved outwardly so as to guide the wires carried by the shuttle members into the slots in the respective pinions. Projecting outwardly from each of the plates 155 adjacent each of the pinions 153 are pins 159 and 160. The two plates 155 are held in spaced relation with respect to one another by a spacer plate 161, all of which are secured together by rivets 162. Pivoted on each of the pins 159, so as to sever or shear the wires at the conclusion of the twisting operation, at a point adjacent the slot 157 in each of the pinions 153, is a knife 163. The knives 163 are held in their uppermost or inoperative position by springs 164 which have one of their ends, as shown at 165, connected to each of the knives and their other ends connected to pins 166 projecting from both sides of the plate 155 and secured thereto. Spaced laterally from each of the wire twisting pinions 153 and secured to one of the sides of one of the plates 155 is an anvil 167 which has its upwardly extending hook-like portion 168 located adjacent the inner end of the slot 158 of one of the plates 155 for supporting one end of the severed twisted wire sections preparatory to bending or kinking the same in the manner hereinafter described. Pivoted on each of the pins 159 outside each of the anvils 167 and also on each of the pins 160 on the opposite sides of the plates 155 are wire bender arms 169 and 170 respectively. The bender arms 169 and 170 are normally held upwardly or in their inoperative position by springs 171 and 172 respectively. The upper ends of these springs are connected to the transverse pins 166 and their lower ends to the respective bender arms. The operating knives 163 and wire bender arms 169 and 170 are actuated to perform their respective functions in that order by the rollers 152 carried by and on the opposite sides of the respective gears 148 as the wire twister pinions 153 approach the conclusion of their fifth revolution by reason of the intermittent clutch member concluding a single revolution or cycle of operation. The knife members 163 are initially actuated by having the rollers 152 engaging the curved arms or cam portions 172 of the respective knives 163. Following this operation and in close proximity thereto, the rollers 152 on the opposite sides of the respective gears 158 engage the camming or curved surfaces 173 of the opposite and respective wire benders 169 and 170 as clearly shown in Figs. 10 and 13 of the drawings. In order to permit the rapid withdrawal of each of the bender arms 169 and 170 after they have accomplished their bending or kinking operations of the twisted wire sections, the cam portion 173 of each of the bending arms terminates in an abrupt arcuate recess 174, which permits the respective springs 171 and 172 to rapidly return these bender arms from the position shown in Fig. 10 to the position shown in Fig. 16 to thereby permit the easy and rapid withdrawal or freeing of the kinked twisted ends of the wires from the position shown in Fig. 13 to that shown in Fig. 14 of the drawings. Located in the path of and adapted to engage the lower surface of the reciprocable shuttle members 42 are oppositely disposed guide rollers 175 which are journaled on pins 176 secured to the opposite housing sections of the housing 133. The plates 155 which carry the two wire twister pinions 153 and their associated wire severing and wire bending mechanisms are mounted in a vertical recess 177 and bolted between the housing sections 134 and 135 of the housing 133 as clearly shown in Figs. 16 and 17 of the drawings. The side of the housing members 134 and 135 lying adjacent the side of the baling press frame are provided with two vertically spaced apart rectangular and horizontally disposed openings 178, the centers of each of which lie in planes parallel with planes of each of the centers of the wire receiving grooves of each of the wire twister pinions 153 when these pinions are in their home or normally stopped position as shown in Fig. 16 of the drawings. These openings 178 are arranged to receive therein, the foremost ends of each of the shuttle members 42 when both strands of wires from the opposite reels are being forced into the recesses or slots in the respective wire twister pinions preparatory to the twisting operations.

When the shuttle mechanism, together with the shuttle 41 is actuated or tripped by the accumulation of sufficient hay to form a bale as measured by the metering wheel 90, as previously described, the wires 142 from the reels 108 on the shuttle side of the baler are carried or conveyed transversely across the baling chamber and brought into contact with the respective wires 129 from the reels 125 on the other side of the baler and both sets of wires are then conveyed or forced into the slots 156 of each of the twister pinions 153. At that moment the clutch tripping finger 48 carried by the shuttle 41 trips the clutch to start the gearing mechanism and pinions 153 to twist the wires, sever the wires and kink the wires during one complete cycle of operation of the intermittently driven clutch member. This cycle of operation is completed before the shuttle 41 is withdrawn to its normal stop position or the position shown in Fig. 1 of the drawings. This clutch tripping mechanism includes a roller arm or lever 179 which is journaled on a pin or shoulder bolt 180 carried by one of the housing sections of the housing 133. Journaled on the lower end of the arm 179 is a roller 181 which is swingable into the path of and adapted to engage an arcuate or hook portion 182 of the clutch pawl 145 to disengage the roller 146 from the clutch corrugations of the continuously driven clutch member 138. The inward movement of the roller 181 and its arm 179 towards the axis of the clutch mechanism is limited or stopped by engagement with the periphery of the disc-like member 143 mounted on the gear 142 or intermittently driven clutch member 140. (See Fig. 16 of the drawings.) The arm 179 is normally urged into the path of the pawl 145 by a spring 183 which has one end connected to an apertured ear 184 of the lever 179 and the other end thereof connected to the transverse pin 166. Pivotally connected to the arm or lever 179 above its pivot 180 as shown at 185, is a trip member, generally indicated by the reference character 186. This trip member 186 is in the form of a bell-crank lever and has one arm as shown at 187 normally resting in a horizontal position and upon a rest or ledge 188 formed on one of the housing members 133 and when the arm 187 is displaced from its normal resting position, it is returned thereto by the gravity or weight of the horizontal arm to assume the position shown in Figs. 6 and 16 of the drawings. The outer end of this trip member is inwardly curved or arcuated as shown at 189, complementary to an outwardly curved end 190 of the trip finger 48. The pivotal movement of this arm 187 is guided between two vertical ribs 191 formed integrally with the opposite housing sections 134 and 135. One of these ribs terminates in a stop as shown at 192 for limiting the upward movement of the outer or free end of this arm 187. The rear end of this trip member or bell-crank 186 is provided with an upwardly extending arm 193 which is located in the path of and adapted to be engaged by one of the rollers 152 carried by the upper gear 148 during the cycle of operation of this mechanism. Located on one side of the housing member 134 and on the side adjacent the baler, is an arcuate opening 194 which is in alignment with the clutch tripping finger 48 to permit its entrance into the housing for tripping the clutch mechanism in the following manner:

The clutch tripping mechanism just described operates as follows: With the trip member 186 and the roller arm 179 in the position shown in Fig. 16 of the drawings, the intermittently operated clutch member 140 together with its gear 142 are in stopped or inoperative position. Upon the actuation or movement of the shuttle member 41 to the position shown in Fig. 6, the forward end 190 of the clutch trip finger 48 engages the outer end of the trip member 186 to actuate the same, this member in turn, actuates the roller arm 179 to disengage the roller 181 from the hook 182 of the pawl 145, thereby permitting the roller 146 of the pawl to engage one of the corrugations in the continuously driven clutch member 138 to operatively drive the wire twisting, severing and kinking mechanism in the manner hereinafter described. The upper gear 148 as well as the other gears are driven in the directions of the arrows indicated in Figs. 6 and 9 of the drawings. After a certain portion of the cycle of operation of this mechanism, one of the rollers 152 on the upper gear 148 will engage the arm 193 of the trip member 186 to actuate it from the position shown in Fig. 6 to the position shown in Fig. 9, or to a position where its outer end 189 will be actuated upwardly out of engagement with the end 190 of the trip finger 48. During this time and in fact, during the complete cycle or single revolution of the intermittently driven clutch member, the shuttle 41 will remain in position to serve its function as an anvil as shown in Figs. 9 and 13 until the wire twister pinions and associated mechanism complete their operations of twisting, severing and kinking of the wires. In other words, the wire twister pinions 153 will have completed their five revolutions before the shuttle 41 is withdrawn to its normal inoperative position, or the position shown in Fig. 1 of the drawings. After one of the rollers 152 on the upper gear 148 has passed the end of the arm 193, the outer end of the trip member 186 will fall by gravity so as to rest on the inner end of the clutch trip finger 48 as shown in Fig. 10 of the drawings. At the same time, the roller arm 179 will be actuated by the spring 183 to move the roller 181 into the path of the pawl 145 preparatory to disengaging the continuously driven clutch member 138 from the intermittently driven clutch member 140. When the trip finger 48 has been withdrawn from the housing 133, the arm 187 of the trip member 186 will fall by gravity to assume its normal horizontal position as shown in Figs. 6 and 16 of the drawings, preparatory for the next tripping operation. The operative parts shown in Fig. 10 of the drawings show the relative position of these parts upon approaching or reaching the conclusion of their cycle of one operation so that upon the withdrawal of the trip finger 48, the trip member 186 assumes its horizontal position or the position shown in Fig. 16 of the drawings.

Summarizing the advantages of my improved method of knotting or twisting two strands of wire into two twisted sections, subsequently severing the twisted sections apart and then kinking these sections for securely fastening the wires together, as well as the device for performing this method, I shall first outline the successive steps by which this method is accomplished. By referring to Figs. 11 to 15 inclusive, the successive steps are shown in their proper sequence. In Fig. 11 the shuttle member 41 carries one strand of the wire 112 on one side of the baler into contact with the other strand of the wire 129 on the other side of the baler and both strands of wire are simultaneously forced by the shuttle 41 into the slots on the wire twister pinions 153 after which the pinions are revolved five complete revolutions and the twisted wires assume the position and formation of two twisted sections on each side of each of the pinions with the outer ends of the twisted sections supported in the grooved or slotted pointed ends 46 of the shuttle 41. In this position the pointed ends of the shuttle members serve the function of anvils during the bending operation. The next successive step in the method is the severing operation by each of the knives 163 which operate their respective shearing edges adjacent one side of each of the slots in the respective twister pinions 153. The third step in my improved method is disclosed in Fig. 13 of the drawings in which the opposite bender arms 169 and 170 are actuated to place a kink or bend in each of the severed twisted sections of the wire. One of each of these sections is kinked or formed by each of the bender arms 169 by having the opposite ends supported by the slots of the respective wire twister pinions 153 on one side and the other ends of the twisted sections supported in the slots between the pointed ends 46 of the shuttle 41 on the other side. The next step in my improved method is shown in Fig. 14 where the kinked or hook-like section is released from the position after the kinking operation preparatory to assuming its position as part of the band embracing the bale. After the bale is discharged from the compression chamber of the baler the expansion of the hay in the bale will cause the wire band to be placed under tension and when tension is placed on the wires, the bent or kinked ends of the twisted sections will revolve in a crank-like fashion until they strike the straight portions of the wire bands so as to lock themselves thereagainst, in the manner disclosed in Fig. 15 of the drawings. When the twisted ends of the wires stop against the straight portion of the bands in the manner shown in Fig. 15 of the drawings, they form stops and prevent further untwisting so that further strain on the wire bands will break the bands or wires in some other place rather than untwist the twisted ends.

The operation of my improved novel wire knotting or twisting mechanism is synchronized with a shuttle mechanism and the reciprocatory plunger in the manner hereinbefore described so as to perform their respective functions in proper order.

From the above description it will be seen that I have not only provided a novel and improved construction of a wire knotting or twisting mechanism for securely fastening the ends of wire bands together, but also a novel method of accomplishing this object. The invention is adaptable for use in connection with any kind of hay baler, but is especially advantageous for use with the stationary, portable or pick-up types of hay balers.

While in the above specification I have described certain steps of my improved method and construction of an automatic wire twisting or tying device for baling hay, it will, of course, be understood that variations both in the method and construction may be employed without departing from the spirit and scope of the invention as expressed in the appended claims.

What I claim as my invention and desire to secure by Letters Patent is:

1. The combination with a baler, of a reciprocable plunger mounted therein, a reciprocable shuttle mounted on said baler and operatively connected to said plunger, a wire twisting mechanism and a wire bending mechanism carried by said baler and operatively related to said shuttle, and means for holding said shuttle adjacent said twisting mechanism during wire twisting and bending operations.

2. The combination with a baler having a frame, of a baling chamber therein, a reciprocating plunger mounted in said chamber, a transversely movable shuttle mounted on said frame and operatively connected to said plunger, means responsive to the amount of hay passing through said chamber for rendering said shuttle operative by the movement of said plunger, and wire twisting and bending mechanisms mounted on said frame and rendered operative by the transverse movement of said shuttle.

3. The combination with a baler having a frame and a baling chamber in said frame, of a reciprocable plunger mounted in said chamber, a wire shuttle mechanism operatively connected with said plunger and adapted to move across said chamber, a wire securing mechanism mounted on said frame including wire twisting mechanism, a wire severing mechanism and wire bending mechanism, and means controlled by said shuttle for actuating said wire twisting, severing and bending mechanisms.

4. The combination with a baler having a frame and a baling chamber in said frame, of a reciprocable plunger mounted in said chamber, a wire shuttle mechanism operatively connected with said plunger and adapted to move across said chamber, a wire securing mechanism mounted on said frame including wire twisting mechanism, a wire severing mechanism and wire bending mechanism, and clutch mechanism responsive to the actuation of said shuttle for controlling the actuation of said wire twisting, severing and bending mechanisms.

5. The combination with a pressing chamber and a reciprocable plunger mounted therein, of a reciprocable shuttle mechanism mounted on one side of said chamber, means for operatively connecting said shuttle to said plunger, wire twisting, severing and bending mechanisms mounted on the other side of said chamber, and means for rendering said wire twisting, severing and bending mechanisms operative by the actuation of said shuttle mechanism.

6. The combination with a pressing chamber and a reciprocable plunger mounted therein, of a reciprocable shuttle mechanism mounted on one side of said chamber, means for operatively connecting said shuttle to said plunger, wire twisting, severing and bending mechanisms mounted on the other side of said chamber, a clutch mechanism for driving said wire twisting, severing and bending mechanisms, including a continuously driven clutch member and an intermittently driven clutch member, and means actuated by said shuttle for tripping said clutch mechanism to render said wire twisting, severing and bending mechanisms operative.

7. The combination with a baling press and a reciprocable plunger mounted therein, of a reciprocable shuttle mounted on one side of said press, a plurality of parallel links forming a connection between said plunger and said shuttle for moving said shuttle in substantially a transverse plane across said press, a wire knotting mechanism located on the other side of said press, means actuated by said shuttle to render said knotting mechanism operative, and means for holding said shuttle in position adjacent said knotting mechanism during one complete cycle of operation of said knotting mechanism.

8. The combination with a baling press and a reciprocable plunger mounted therein, of a reciprocable shuttle mounted on one side of said press, parallel link mechanism for connecting said shuttle with said press for moving said shuttle in substantially a transverse plane across said press, a shuttle actuating bar operatively connected to said plunger, means for operatively connecting said actuating bar to said shuttle, a wire knotting mechanism located on said press opposite said shuttle, means actuated by said shuttle to render said knotting mechanism operative, and means carried by said actuating bar to hold said shuttle adjacent said knotting mechanism during each complete cycle of operation of said knotting mechanism.

9. The combination with a baling press and a reciprocable plunger mounted therein, of a reciprocable shuttle mounted on one side of said press, parallel link mechanism for connecting said shuttle with said press for moving said shuttle in substantially a transverse plane across said press, a shuttle actuating bar operatively connected to said plunger, means for operatively connecting said actuating bar to said shuttle, a wire knotting mechanism located on said press opposite said shuttle, means actuated by said shuttle to render said knotting mechanism operative, and means carried by said actuating bar and engageable with one of said parallel links for holding said shuttle in position adjacent said knotting mechanism during each complete cycle of operation of said knotting mechanism.

10. The combination with a baling press and a reciprocable plunger mounted therein, of a reciprocable shuttle mounted on one side of said press, parallel link mechanism for connecting said shuttle with said press for moving said shuttle in substantially a transverse plane across said press, a shuttle actuating bar operatively connected to said plunger, means for operatively connecting said actuating bar to said shuttle, means for normally holding said actuating bar out of operative engagement with said shuttle, a wire knotting mechanism located on said press opposite said shuttle, means actuated by said shuttle to render said knotting mechanism operative, and means carried by said actuating bar to hold said shuttle adjacent said knotting mechanism during each complete cycle of operation of said knotting mechanism.

11. The combination with a baling press and a reciprocable plunger mounted therein, of a reciprocable shuttle mounted on one side of said press, parallel link mechanism for connecting said shuttle with said press for moving said shuttle in substantially a transverse plane across said press, a shuttle actuating bar operatively connected to said plunger, means for operatively connecting said actuating bar to said shuttle, means for normally holding said actuating bar out of operative engagement with said shuttle, means rendered operative by the size of said bale for controlling said last named means, a wire knotting mechanism located on said press opposite said shuttle, means actuated by said shuttle to render said knotting mechanism operative, and means carried by said actuating bar to hold said shuttle adjacent said knotting mechanism during each complete cycle of operation of said knotting mechanism.

12. The combination with a baler, of a reciprocable plunger mounted thereon, wire supporting means on each side of said baler, wire twisting, severing and bending mechanisms mounted on one side of said baler, and a reciprocable shuttle mounted on the other side of said baler for conveying the wire from one side to the other side of said baler, there being horizontal slots formed in the forward ends of said shuttle for supporting therein the wires from both sides during the twisting, severing and bending operations on said wires.

13. The combination with a baler, of a reciprocable plunger mounted thereon, wire supporting means on each side of said baler, wire twisting, severing and bending mechanisms mounted on one side of said baler, a reciprocable shuttle mounted on the other side of said baler for conveying the wire from one side to the other side of said baler, there being horizontal slots formed in the forward ends of said shuttle for supporting therein the wires from both sides during the twisting, severing and bending operations on said wires, and means for operatively driving said shuttle and wire twisting, severing and bending mechanisms.

14. The combination with a baler, of a reciprocable plunger mounted thereon, wire supporting means on each side of said baler, wire twisting, severing and bending mechanisms mounted on one side of said baler, a reciprocable shuttle mounted on the other side of said baler having horizontal slots formed therein for supporting wires from both sides of said baler in a position adjacent said wire twisting, severing and bending mechanisms, and means for operatively actuating said shuttle and said wire twisting, severing and bending mechanisms in synchronism with one another.

15. The combination with a baler, of a reciprocable plunger mounted thereon, wire supporting means on each side of said baler, wire twisting, severing and bending mechanisms mounted on one side of said baler, a reciprocable shuttle mounted on the other side of said baler having horizontal slots formed therein for supporting wires from both sides of said baler in a position adjacent said wire twisting, severing and bending mechanisms, means for operatively actuating said shuttle and said wire twisting, severing and bending mechanisms in synchronism with one another, and means for maintaining said shuttle in position adjacent said wire twisting mechanism during a complete cycle of operation of said wire twisting mechanism.

16. The combination with a baler, of a reciprocable plunger mounted thereon, wire supporting means on each side of said baler, wire twisting, severing and bending mechanisms mounted on one side of said baler, a reciprocable shuttle mounted on the other side of said baler having horizontal slots formed therein for supporting wires from both sides of said baler in a position adjacent said wire twisting, severing and bending mechanisms, said wire twisting mechanism including a rotating pinion having a slot therein for the reception of the wires, and means for successively actuating said wire severing and wire bending mechanisms at the conclusion of the wire twisting operation.

17. The combination with a baler, of a reciprocable plunger mounted thereon, wire supporting means on each side of said baler, wire twisting, severing and bending mechanisms mounted on one side of said baler, a reciprocable shuttle mounted on the other side of said baler having horizontal slots formed therein for supporting wires from both sides of said baler in a position adjacent said wire twisting, severing and bending mechanisms, means for operatively actuating said shuttle and said wire twisting, severing and bending mechanisms in synchronism with one another, said wire twisting mechanism including a rotating pinion having a wire receiving slot therein, means for successively actuating said wire severing and said wire bending mechanism at the conclusion of said wire twisting operation, and means for maintaining said shuttle adjacent said pinion during a complete cycle of operation of said wire twisting, severing and bending mechanisms.

18. The combination with a baler, of a reciprocable plunger mounted thereon, separate wire supporting means located on the opposite sides of said baler, a shuttle located on one side of said baler and adapted to be actuated across said baler, an actuating bar connected with said plunger, a bell-crank pivotally connected to said shuttle and adapted to be intermittently connected to and actuated by said actuating bar, metering mechanism mounted on said baler and operatively related to said bell-crank for connecting the same to said actuating bar, wire knotting mechanism mounted on said baler opposite said shuttle including wire twisting means, wire severing means and wire bending means, and means actuated by said shuttle for controlling the operation of said wire twisting, severing and bending mechanisms.

19. The combination with a baler, of a reciprocable plunger mounted thereon, separate wire supporting means located on the opposite sides of said baler, a shuttle located on one side of said baler and adapted to be actuated across said baler, an actuating bar connected with said plunger, a bell-crank pivotally connected to said shuttle and adapted to be intermittently connected to and actuated by said actuating bar, metering mechanism mounted on said baler and operatively related to said bell-crank for connecting the same to said actuating bar, wire knotting mechanism mounted on said baler opposite said shuttle including wire twisting means, wire severing means and wire bending means, a clutch mechanism operatively related to said wire twisting mechanism, a trip mechanism for said clutch, and a tripping member carried by said shuttle and engageable with said tripping mechanism for operatively controlling said clutch.

20. The combination with a baler, of a reciprocable plunger mounted thereon, separate wire supporting means located on the opposite sides of said baler, a shuttle located on one side of said baler and adapted to be actuated across said baler, an actuating bar connected to said plunger, a bell-crank pivotally connected to said shuttle and actuated by said actuating bar, metering mechanism mounted on said baler and operatively related to said bell-crank for connecting the same to said actuating bar, wire knotting mechanism mounted on said baler opposite said shuttle including wire twisting means, wire severing means and wire bending means, a clutch mechanism including a continuously driven clutch member and an intermittently driven clutch member, a clutch pawl for operatively connecting said members together, gearing between said intermittently driven clutch member and said wire twisting means, and means actuated by said shuttle for controlling said clutch pawl.

21. The combination with a baler having a frame and a baling chamber in said frame, of a reciprocable plunger mounted in said chamber, a wire shuttle mechanism mounted on said frame and movable through said chamber, means for delaying the return operation of said shuttle, a wire securing mechanism mounted on said frame including wire twisting mechanism, wire severing mechanism and wire bending mechanism, and means for successively actuating said mechanisms during each cycle of operation of said securing mechanism.

22. The combination with a baler having a frame and a baling chamber in said frame, of a reciprocable plunger mounted in said chamber, a wire shuttle mechanism mounted on said frame, means responsive to the movement of said plunger for controlling the operation of said shuttle, a wire securing mechanism mounted on said frame including wire twisting mechanism, a wire severing mechanism and wire bending mechanism, and means controlled by said shuttle for actuating said wire twisting, severing and bending mechanisms.

23. The combination with a pressing chamber and a reciprocable plunger mounted therein, of a reciprocable shuttle mechanism mounted on one side of said chamber, means responsive to the movement of said plunger for controlling the operation of said shuttle, wire twisting, severing and bending mechanisms mounted on the other side of said chamber, and means for rendering said wire twisting, severing and bending mechanisms operative by the actuation of said shuttle mechanism.

24. The combination with a pressing chamber and a reciprocable plunger mounted therein, of a reciprocable shuttle mechanism mounted on one side of said chamber, means responsive to the movement of said plunger for controlling the operation of said shuttle, wire twisting, severing and bending mechanisms mounted on the other side of said chamber, means for rendering said wire twisting, severing and bending mechanisms operative by the actuation of said shuttle mechanism, and means for interrupting the return movement of said shuttle mechanism during a certain cycle of its operation.

25. The combination with a baler having a frame and a baling chamber in said frame, of a reciprocable plunger mounted in said chamber, a wire shuttle mechanism mounted on said frame, means for synchronizing the operation of said plunger and said shuttle, a wire securing means mounted on said frame including a wire twisting mechanism, a wire severing mechanism and wire bending mechanism, and means for actuating said wire twisting, severing and bending mechanism.

26. The combination with a baler having a frame and a baling chamber in said frame, of a reciprocable plunger mounted in said chamber, a wire shuttle mechanism mounted on said frame, means for synchronizing the operation of said plunger and said shuttle, a wire securing means mounted on said frame including a wire twisting mechanism, a wire severing mechanism and wire bending mechanism, and means for successively actuating said wire twisting, severing and bending mechanisms.

27. The combination with a baler having a frame and a baling chamber in said frame, of a reciprocable plunger mounted in said chamber, a wire shuttle mechanism mounted on said frame, means for synchronizing the operation of said plunger and said shuttle, a wire securing means mounted on said frame including a wire twisting mechanism, a wire severing mechanism and wire bending mechanism, and means for actuating said shuttle toward and retaining the same adjacent said wire securing means during the actuation of said wire twisting, severing and bending mechanisms.

28. The combination with a pressing chamber and a reciprocable plunger mounted therein, of a reciprocable shuttle mechanism mounted on one side of said chamber, means for synchronizing the operation of said shuttle mechanism with said plunger, wire twisting and cutting mechanisms mounted on the other side of said chamber, means for actuating said wire twisting and severing mechanisms, and means including a guide for holding said shuttle mechanism in a position adjacent said wire twisting and cutting mechanisms during substantially one complete cycle of operation of said last named mechanisms.

29. The combination with a baling press and an actuatable shuttle mounted on the outside of said press and movable through said press, a wire knotting mechanism mounted on said press opposite said shuttle, means for actuating said shuttle and said knotting mechanism, and means including a guide for holding said shuttle in a position adjacent said knotting mechanism during substantially one complete cycle of operation of said knotting mechanism.

30. The combination with a baling press having a baling chamber and a movable shuttle mounted on the press for movement in a plane to penetrate said chamber, a wire knotting mechanism mounted on said press opposite said shuttle mechanism, means for actuating said shuttle, means for actuating said knotting mechanism and means including a guide for holding said shuttle in a position adjacent said knotting mechanism during substantially the operation of said knotting mechanism.

31. The combination with a baler having a frame and a baling chamber therein, of a wire shuttle mechanism mounted on said frame and adapted to move across said chamber, a wire securing mechanism mounted on said frame including wire twisting mechanism, wire severing mechanism and wire bending mechanism, and rotary clutch mechanism responsive to the actuation of said shuttle for controlling the actuation of said wire twisting, severing and bending mechanism.

32. The combination with a baler having a frame having a baling chamber therein, a wire shuttle mounted on said frame, a wire securing means mounted on said frame opposite said shuttle including wire twisting mechanism, wire severing mechanism and wire bending mechanism, means for actuating said shuttle, and automatically controlled clutch means for actuating said wire twisting, severing and bending mechanisms.

33. The combination with a baler having a frame having a baling chamber therein, a wire shuttle mounted on said frame, a wire securing means mounted on said frame opposite said shuttle including wire twisting mechanism, wire severing mechanism and wire bending mechanism, means for actuating said shuttle, said wire twisting, severing and bending mechanisms, and means carried by said frame and operatively connected to said shuttle for holding said shuttle in a position adjacent said securing means during substantially one complete cycle of operation of said wire twisting, severing and bending mechanisms.

34. The combination with a baler having a baling chamber therein, wire supporting means on the opposite portions of the baler, wire twisting, severing and bending means mounted on one side of the baler, and a movable shuttle mounted on the other side of the baler for conveying the wire from one side to the other side of the baler, there being spaced apart slots in the forward end of the shuttle for supporting therein the wires from both sides during substantially one cycle of operation of the twisting, severing and bending mechanisms.

35. The combination with a baler having a baling chamber therein, wire twisting and severing mechanisms mounted on one side of said baler, wire supporting means on the opposite sides of said baler, a movable shuttle mounted on the other side of said baler for conveying the wire from one side to the other side of said baler, a pulley journaled adjacent one side of the baler, a second pulley journaled adjacent the outer end of said shuttle whereby the wire on one side of said baler is trained about both of said pulleys for furnishing sufficient wire on the inward stroke of said shuttle, there being spaced apart slots in the forward end of the shuttle and having the bottom of the slots supporting therein the wire from both sides of the baler during substantially one cycle of operation of the twisting and severing mechanisms.

36. The combination with a baler having a baling chamber therein, wire twisting, severing and bending mechanisms mounted on one side of said baler, wire supporting means on the opposite sides of said baler, a movable shuttle mounted on the other side of said baler for conveying the wire from one side to the other side of said baler, a pulley journaled adjacent one side of the baler, a second pulley journaled adjacent the outer end of said shuttle whereby the wire on one side of the baler is trained about both pulleys for furnishing a sufficient supply of wire on the inward stroke of said shuttle, there being spaced apart slots in the forward end of the shuttle and having the bottom of the slots supporting therein the wire from both sides of the baler during substantially one cycle of operation of the twisting, severing and bending mechanisms.

37. The combination with a baler having a baling chamber therein, wire twisting and severing mechanisms mounted on one side of said baler, a movable shuttle mounted on the other side of said baler for conveying the wire from one side to the other side of said baler, a relatively stationary pulley journaled in close proximity to one side of said baling chamber and adjacent one side of said shuttle, and a second pulley journaled adjacent the outer end of said shuttle and movable therewith, there being a wire trained about said pulleys and extending from the first named pulley to the second named pulley and from the second named pulley to the forward end of said shuttle, whereby two portions of said wire extend substantially parallel with one another for furnishing a major portion of the wire required on the inward stroke of said shuttle.

38. The combination with a baler having a baling chamber therein, wire twisting, severing and bending mechanisms mounted on one portion of said baler, a movable shuttle mounted on an opposite portion of said baler, a relatively stationary pulley journaled in close proximity to one side of said baler and adjacent one side of said shuttle, and a second pulley journaled adjacent the outer end of said shuttle and movable therewith, there being a wire trained about said pulleys and extending from the first named pulley to the second named pulley and from the second named pulley to the forward end of said shuttle whereby two portions of said wire extend substantially parallel for furnishing sufficient supply of wire on the inward stroke of said shuttle.

HERMAN E. ALTGELT.

REFERENCES CITED

The following references are of record in the file of this patent:

UNITED STATES PATENTS

| Number | Name | Date |
|---|---|---|
| 866,934 | Katz | Sept. 24, 1907 |
| 994,662 | Schubert | June 6, 1911 |
| 1,213,993 | Zachow | Jan. 30, 1917 |
| 1,889,372 | Nolan | Nov. 29, 1932 |
| 2,143,316 | Hoffmann | Jan. 10, 1939 |
| 2,233,133 | Kennedy | Feb. 25, 1941 |
| 2,277,394 | Everhart et al. | Mar. 24, 1942 |
| 2,355,644 | Haase | Aug. 15, 1944 |
| 2,446,878 | Kaupke et al. | Aug. 10, 1948 |
| 2,585,425 | Baskerville | Feb. 12, 1952 |

FOREIGN PATENTS

| Number | Country | Date |
|---|---|---|
| 34,276 | Netherlands | Dec. 15, 1934 |